Feb. 12, 1935.  J. H. ROBERTSON ET AL  1,990,614
VARIABLE SPEED FRICTION GEARING
Filed Aug. 20, 1931   4 Sheets-Sheet 2
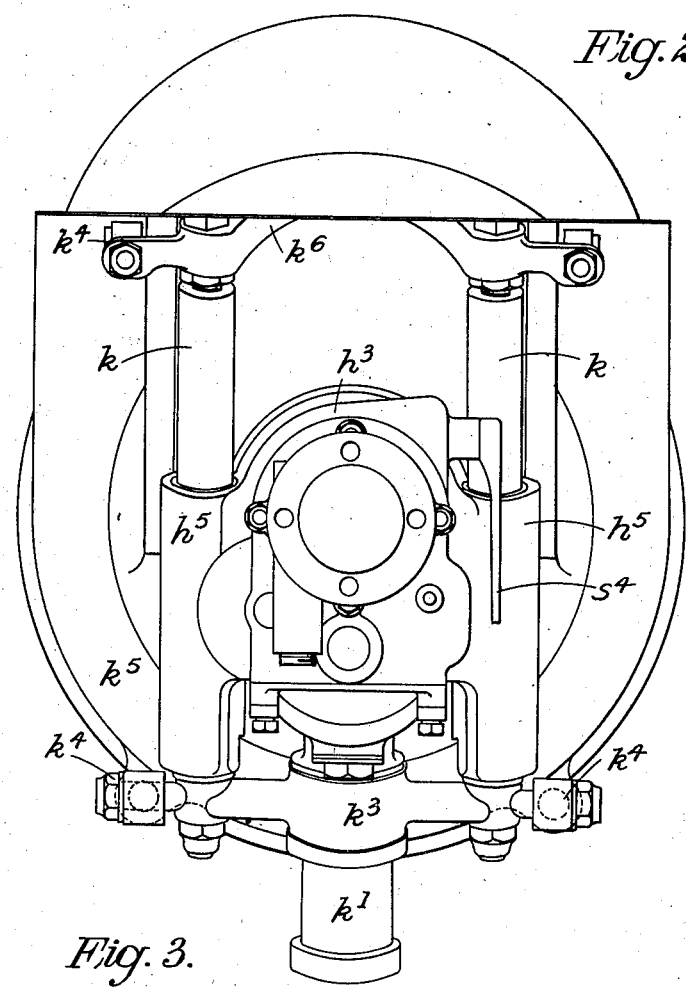
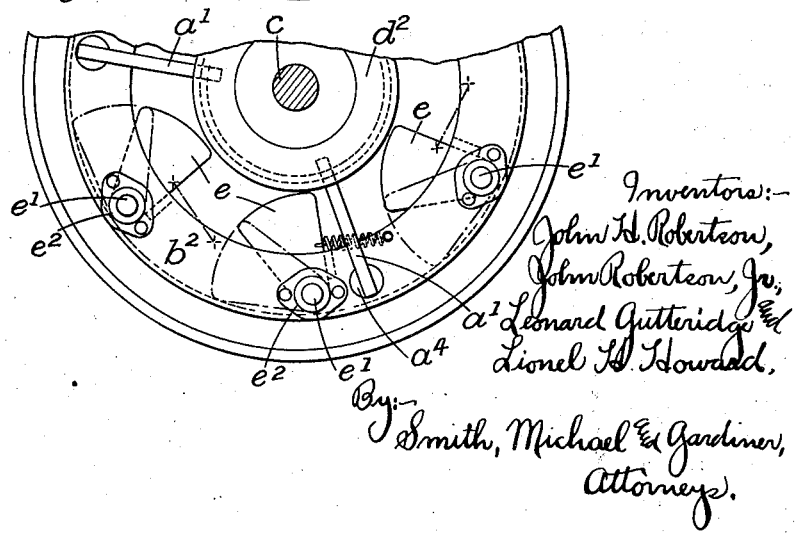

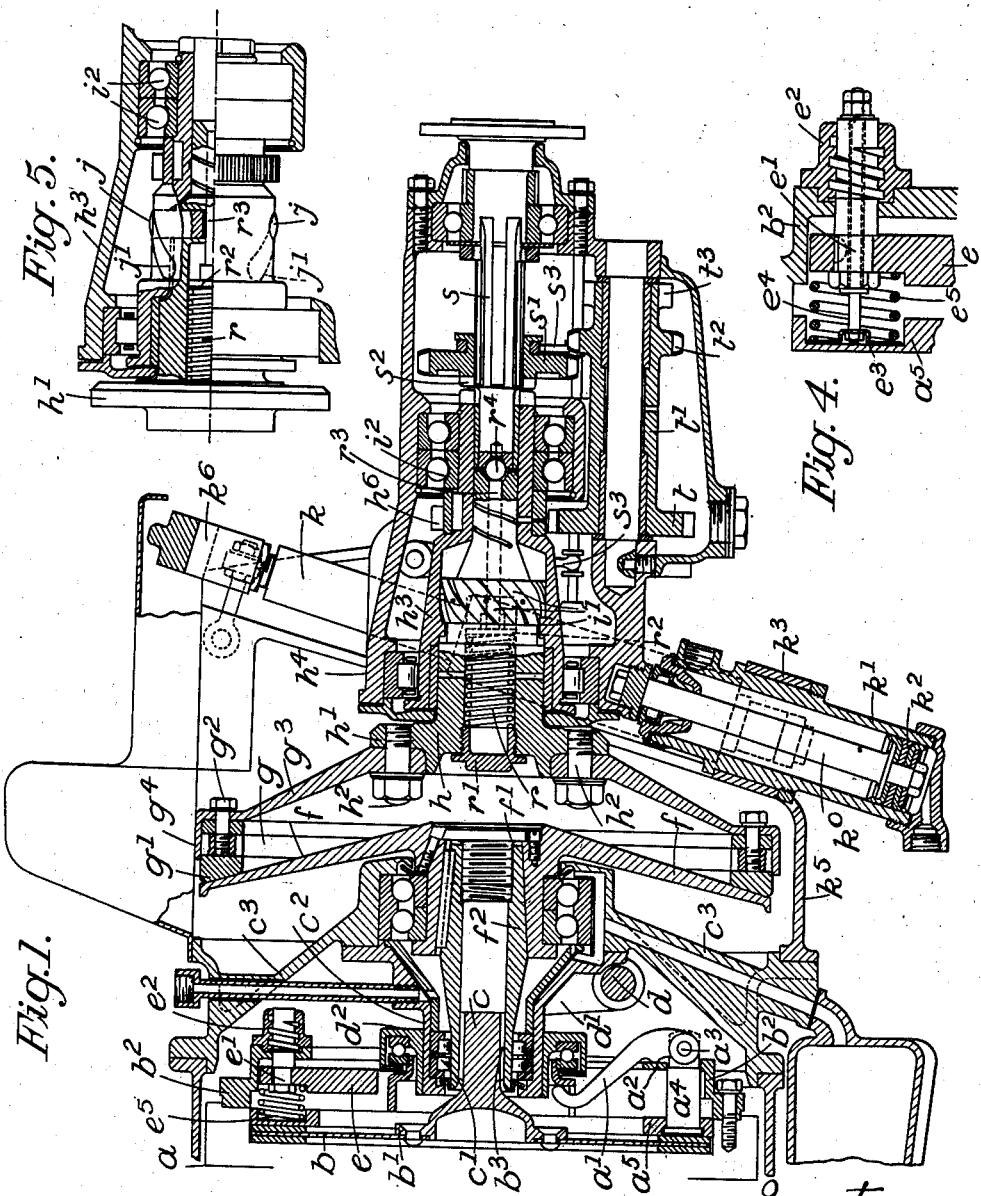

Feb. 12, 1935.  J. H. ROBERTSON ET AL  1,990,614
VARIABLE SPEED FRICTION GEARING
Filed Aug. 20, 1931    4 Sheets-Sheet 3

Feb. 12, 1935.   J. H. ROBERTSON ET AL   1,990,614
VARIABLE SPEED FRICTION GEARING
Filed Aug. 20, 1931   4 Sheets-Sheet 4
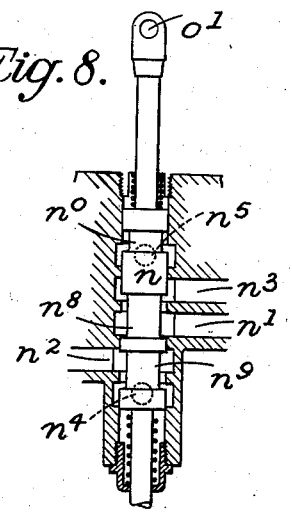
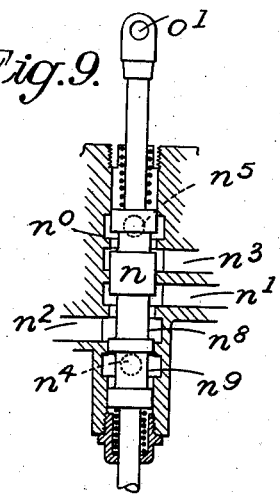
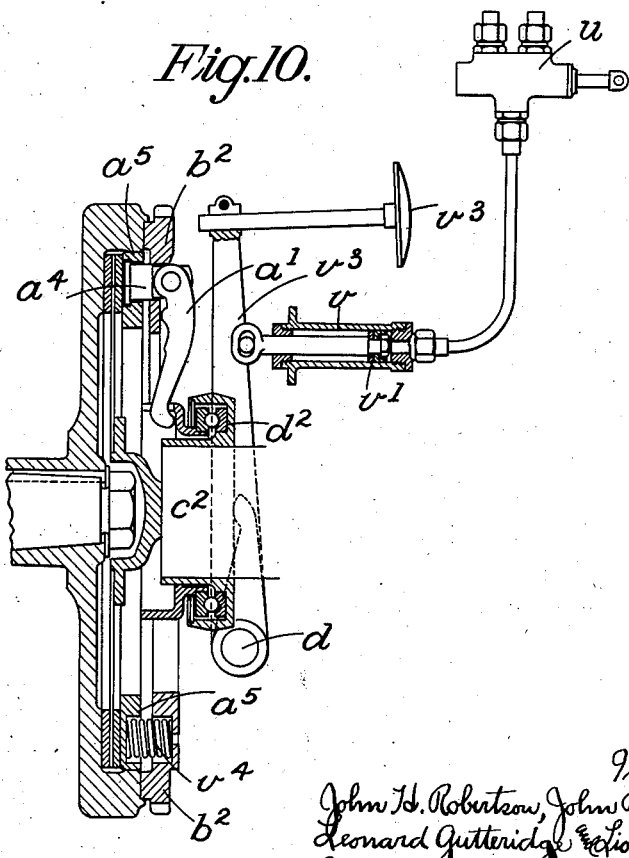

Patented Feb. 12, 1935

1,990,614

UNITED STATES PATENT OFFICE 1,990,614

VARIABLE SPEED FRICTION GEARING

John Hogg Robertson, John Robertson, Jr., Leonard Gutteridge, and Lionel Horace Howard, London, England Application August 20, 1931, Serial No. 558,362
In Great Britain February 21, 1931

2 Claims. (Cl. 74—199)

This invention relates to variable friction gearing of the type in which a driven member is adapted to make face contact with a driving member, a direct drive position being provided in which the two members engage coaxially in the manner of a disc or cone clutch, and a series of indirect drive positions being provided in which one member is displaced laterally to a variable extent so that contact takes place at points (or limited areas) of which the respective radial distances from the axes of the two members are unequal.

The present invention consists in improved arrangements for obtaining and controlling the engagement of the drive, the variation of the transmission ratio, and the pressure which maintains the two members in frictional engagement during operation.

The invention comprises the use of a friction clutch conveying the drive to the friction gearing members, for the purpose of relieving the latter of wear due to slip at starting and other times, in combination with means for regulating the engaging pressure of the friction gearing members so as to ensure that slip at the surfaces of the latter is avoided as far as possible.

In the improved variable speed friction gearing, the driving member, consisting of a conical disc, is mounted upon a shaft to which the drive can be communicated through a friction clutch, which may be automatically controlled by a centrifugal governor, and the laterally displaceable driven member consisting of a wheel or disc with an annular friction face is regulated as regards its coaxial or eccentric position by a gear-controlling device while being pressed axially forward into engagement with the driving member by a second or pressure-controlling device. The gear-controlling device may be operated by power independent of the friction gearing, for example by fluid pressure, and the second or pressure-controlling device by which the driven member is pressed axially forward into engagement, may be operated by the torque upon the shaft of said driven member.

The invention is hereafter described with reference to the accompanying drawings in which:—

Figure 1 is a sectional elevation of a variable speed friction gearing embodying the present invention.

Figure 2 is an end elevation seen from the right of Figure 1.

Figures 3 and 4 are details of the controlling mechanism for the automatic friction clutch seen in Figure 1.

Figure 5 is a detail of a modified form of coupling between the driven member and the transmission shaft.

Figures 8 and 9 are diagrams showing the control valve in two other positions.

Figure 10 is a diagram showing the friction clutch provided with hydraulic control.

Figure 6:
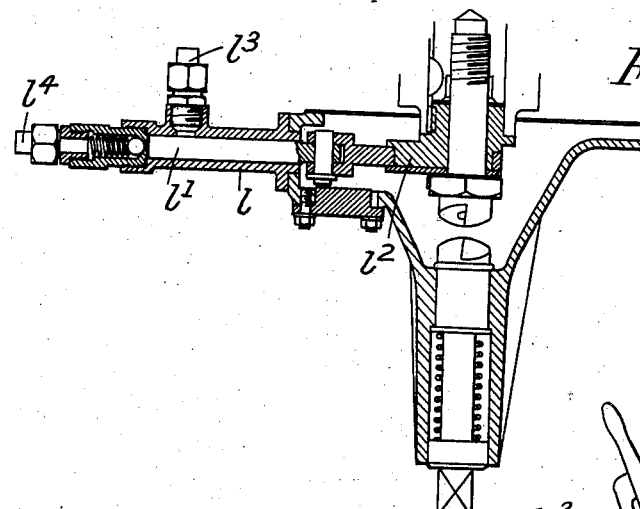
Figure 6 is a sectional view of the oil pump for the hydraulic operation of the gear.

In the following description it will be assumed that the present invention is applied to a motor vehicle, though it will be clear that the invention may be applied to other purposes and to machinery in general.

Referring to Figure 1, the flywheel $a$ secured upon the crankshaft of the engine is provided with a friction clutch, of which the driven member $b$ is carried by a flanged hub $b^1$ upon a shaft $c$ rotatably mounted inside the bell housing or cover $c^3$ of the flywheel pit. The friction clutch may be operated for disconnecting the drive, by a pedal or other control of any suitable type, by means of the cross shaft $d$ carrying a fork $d^1$ engaging a slidable thrust bearing or collar $d^2$ mounted around the inner end of the central boss $c^2$ of the cover $c^3$. The thrust collar $d^2$ acts upon the inner ends of a number of clutch levers $a^1$ fulcrumed at $a^2$ upon the cover plate $b^2$ of the clutch, the outer ends of these levers being pivotally connected by pins $a^3$ to slidable plungers $a^4$ passing through the cover plate $b^2$ and engaging the presser plate $a^5$.

The engagement of the friction clutch plates $a$, $b$, $a^5$, instead of being produced by a spring or springs in the usual manner, is obtained by the action of a speed-responsive governor mechanism (see Figure 3), which as soon as the engine exceeds a low "idling" speed, and provided the clutch is not disengaged by the pedal or the like causing the plungers $a^4$ to draw the presser plate $a^5$ away from the driven plate $b$, tends to bring the clutch members $a$, $b$, $a^5$ into engagement so as to transmit the drive to the clutch shaft $c$. In the form shown, the governor comprises weighted levers $e$ mounted on studs $e^1$ screwing through nuts $e^2$ secured to the rotating cover plate $b^2$ of the clutch, so that the swinging movement of the levers $e$ due to centrifugal force produces a wedging pressure along the axes of the studs against the presser plate $a^5$ of the clutch. In order to limit the engaging pressure applied to the clutch, yielding connections such as coiled springs $e^5$ or rubber buffers are interposed between the lever bosses and the clutch presser plate $a^5$, these connections becoming fully loaded at completion of the outward movement of the governor levers $e$, which takes place at a moderate speed of the engine. As shown for example in Figure 4, the extension of the springs $e^5$ may be limited by adjustable stops $e^3$ carried by rods $e^4$ passing through the studs $e^1$, these stops coming into operation during the automatic release of the clutch due to decrease of the engine speed, so as to relieve the presser plate $a^5$ of the spring pressure while the springs still remain under compression; conversely, during the automatic engagement of the friction clutch, the pressure will be applied by the governor levers $e$ acting through the springs $e^5$ under an initial compression determined by the adjustment of the stops $e^3$.

The driving disc $f$ of the friction gearing, consisting for example of a plain steel cone, is shown secured by keying upon the tapered end $f^1$ of a sleeve $f^2$ surrounding the clutch shaft $c$, the sleeve being connected through the shaft $c$ to the driven member $b$ of the clutch by splines or the like floating connection $b^3$ to permit the disengaging movement of the clutch member $b$, while the sleeve itself has substantially no axial travel beyond that required for the freedom of its bearings $c^1$ which are supported in the bell housing cover $c^3$; the latter is stiffened by ribs or the like so as to withstand the end thrust received through the bearing $c^1$ behind the driving disc and generated by the pressure of the driven member $g$ against said disc.

The driven member $g$, which is displaceable both axially and laterally, is fitted with a bevel-faced friction ring $g^1$, made for example of an asbestos or like compound in combination with a synthetic resinous or other binder, the ring being held by rivets or bolts $g^2$ in a wheel or spider $g^3$ made of aluminium alloy, pressed steel or the like, having a flanged or channel rim $g^4$. The driven shaft $h$, formed with a flange $h^1$ supporting the driven member secured thereon by studs $h^2$, is rotatably and slidably mounted in a sleeve $h^3$ within a cylindrical socket $h^4$, a screw coupling device being interposed between the slidably mounted shaft $h$ which is formed with quick-pitch screw threads $i$ and the sleeve $h^3$ formed with female threads $i^1$; this sleeve is shown integral with the primary shaft of a change-speed and reverse-gear box from which the socket $h^4$ extends.

In proportion to the torsional resistance to motion of the primary or transmission shaft and sleeve $h^3$, the screw coupling device $i\ i^1$ produces an axial thrust along the slidably mounted shaft $h$ so as to force the driven member $g$ into frictional contact with the driving disc $f$, the reaction of this thrust being taken by a ball or other bearing $i^2$ inside the gear box.

Figure 5 illustrates a coupling device which may be substituted for the screw coupling $i\ i^1$ between the shaft $h$ secured to the driven member $g$ and the sleeve $h^3$ which forms the primary shaft of the transmission. In this modification, the shaft $h$ is fitted with a transverse pin $j$ the ends of which engage in helical slots $j^1$ formed in the surrounding sleeve $h^3$, the inclination and direction of these slots being the same as those of the screw-threads $i\ i^1$ in the coupling shown in Figure 1.

The gear box and socket $h^4$ are mounted to rise and fall upon a pair of parallel slide rods $k$ (see Figure 2), the position of the socket being controlled by movement in either direction as desired, by means of a hydraulic ram $k^1$, the piston $k^2$ of which is secured to the socket by rod $k^0$. The slide rods $k$ are shown as being set in parallel vertical planes at an inclination (see Figure 1) substantially equal to that of the lowest radius of the driving cone $f$, but obviously the slide rods may be set at a different angle of inclination or even vertically, so that the lateral displacement of the gear box and socket $h^4$ will cause axial travel of the driven member $g$ and shaft $h$ in relation to the socket $h^4$.

The ram cylinder is carried by a beam $k^3$ supported by brackets $k^4$ upon the housing $k^5$, the ends of the beam forming attachments for the lower extremities of the guide rods $k$, the upper extremities of which are connected by an arched bridge-piece $k^6$ having its ends likewise supported by brackets $k^4$ at the top of the housing $k^5$. As seen in Figure 2, the slide rods $k$ pass through inclined lugs $h^5$ upon the opposite sides of the socket $h^4$.

The movement of the hydraulic ram piston for raising or lowering the gear box and socket $h^4$ and thereby varying the transmission ratio of the friction gearing, may be initiated, stopped or reversed by the driver of the vehicle, for example by one or more control valves placed at any convenient position and controlled from the steering wheel or otherwise, in order to produce movement in either direction as desired. Thus the transmission gear may be selected or changed to suit variation of driving conditions by bringing about a movement of the socket $h^4$, the friction gearing members $f\ g$ being maintained in constant engagement by the screw coupling device $i\ i^1$ which, so long as the torsional resistance continues, causes an axial thrust upon the driven member $g$ in proportion to such resistance.

Figure 7:
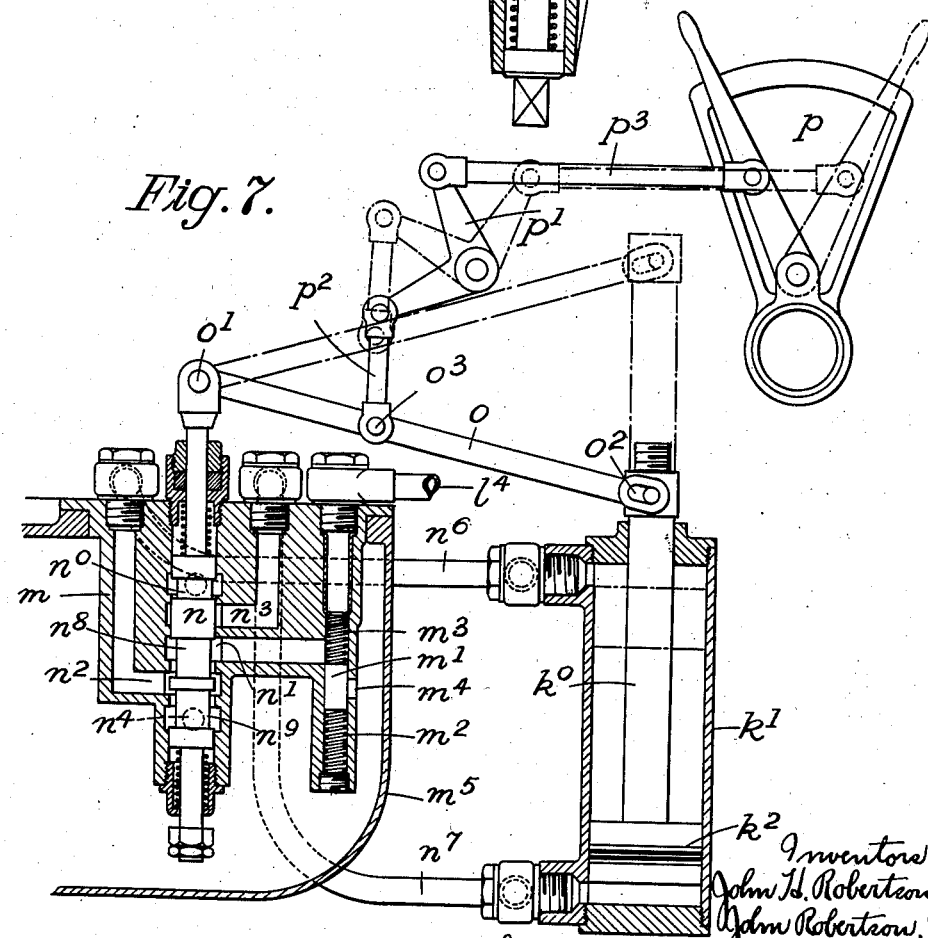
Figure 7 is a sectional view of the control valve for the hydraulic ram.

In the arrangement illustrated in Figures 6 and 7, hydraulic pressure employed for the gear controlling device is generated by a small reciprocating pump $l$, having its piston $l^1$ driven by an eccentric $l^2$ upon the crankshaft of the engine, the pump suction and delivery being connected by pipes $l^3\ l^4$ respectively to the engine sump and to the casing $m$ of a controlling piston valve $n$; the oil entering the casing $m$ acts upon a pressure relief valve $m^1$ controlled by springs $m^2\ m^3$ and slidable over a port $m^4$ allowing the oil to escape into the sump when a given pressure is exceeded.

Figure 7 shows the control valve casing $m$ located inside the engine sump or crank case $m^5$, so that any leakage of oil from lower end of the valve $n$ is confined to the interior of the crank case. The valve casing is formed with an annular admission port $n^1$ receiving oil from the top of the relief valve $m^1$, with two ports $n^2\ n^3$ delivering through pipes $n^6\ n^7$ respectively to the top and bottom ends of the ram $k^1$, and with two ports $n^4\ n^5$ allowing the oil to escape into the sump. The piston valve $n$ is formed with three circumferential grooves $n^8\ n^9\ n^0$, co-operating with the ports $n^1 \ldots n^5$ in the wall of its casing, and its movements are limited by abutments shown in the form of screw caps enclosing the springs which normally keep it in the middle position, as shown in Figure 7. In the normal position, the port $n^3$ is shut off, so that the ram piston $k^2$ is prevented from falling either under the weight of the parts connected thereto or by the centering effect of the axial pressure between the members $f$ and $g$, while the pump delivers freely to exhaust through the ports $n^1$ $n^2$ $n^4$ which are connected by the grooves $n^8$ $n^9$. Upon sliding movement of the piston valve $n$ in either direction, as shown in Figures 8 and 9 respectively, the oil pressure is directed by the groove $n^8$ and the port $n^2$ or $n^3$ to one or other end of the ram $k^1$, the other end of which is connected to exhaust through the ports $n^3$ $n^5$ (connected by the groove $n^0$) or the ports $n^2$ $n^4$ (connected by the groove $n^9$), so that downward or upward movement of the socket $h^4$ and of the driven member $g$ will be produced.

The piston valve casing $m$ may be located adjacent to the ram $k^1$, as shown in Figure 7, and the valve spindle connected at $o^1$ to one end of a rocking lever $o$, the other end of which is connected at $o^2$ to the piston rod $k^0$ or to some part moving with the latter, while an intermediate point $o^3$ of the lever is operated by the manual or like control device $p$ through a bell crank $p^1$ and links $p^2$ $p^3$; the relative lengths of the two arms of the lever $o$ are made proportional to the respective strokes of the piston valve $n$ and of the ram piston $k^2$, so that the ram is caused to follow the movement of the control device $p$, as indicated in chain lines in Figure 7. The movement of the rocking lever $o$ produced by the piston rod $k^0$ will then tend to center the piston valve $n$ in its normal position, stopping the movement of the socket $h^4$ at a position depending upon the setting of the manual control device $p$, and the piston valve being centered by its springs.

The hydraulic ram $k^1$ may be made single-acting, for example so as to lift the driven member towards the low gear position and to prevent its fall towards the direct drive position, the control valve $n$ being modified accordingly by the omission of the port $n^2$, the groove $n^9$ and the pipe connection $n^6$. Likewise the arrangement shown in Figures 1 and 2 may be altered so that the low gear is obtained in the bottom position.

In addition to the axial thrust resulting from the torsional resistance on the transmission shaft, a light initial engaging pressure upon the driven member $g$ is produced by a spring $r$ enclosed in the slidable driven shaft $h$ and compressed between a screw plug $r^1$ at the outer end and a washer $r^2$ supported by a thrust rod $r^3$ bearing upon a steel ball $r^4$ at the forward end of the final drive shaft $s$ of the gear box, the thrust being taken upon the rear bearing of the shaft $s$.

A slidable gear wheel $s^1$ mounted on splines upon the shaft $s$ is formed with clutch dogs $s^2$ for engaging corresponding dogs at the rear end of the sleeve $h^3$ which forms the primary shaft of the gear box, this sleeve carrying a constant mesh pinion $h^6$ driving a gear wheel $t$ upon the sleeve $t^1$ which forms the layshaft of the gear box. When the clutch dogs $s^2$ are engaged with the sleeve $h^3$, the gear box provides a direct drive to the shaft $s$; in the position shown in Figure 1, the gear box is in neutral; by sliding the gear wheel $s^1$ towards the right, by means of the striking forks $s^3$ operated by an external lever $s^4$, the wheel $s^1$ can be brought into mesh with a pinion $t^2$ on the layshaft, giving a low-gear drive to the shaft $s$, this being intended for example for use in starting or under emergency conditions when a greater reduction of speed or a lower gear ratio is required than can be obtained by the friction gearing alone. Finally a reverse drive can be obtained by sliding the gear wheel $s^1$ further towards the right, so as to mesh it with an idler wheel (not shown) driven by the reverse pinion $t^3$ on the layshaft.

It will be noted that the engaging pressure upon the friction members $f$ $g$ remains proportional to the torsional resistance to motion of the sleeve $h^3$, neglecting the effect of the spring $r$, and that the use of the emergency low gear or of the reverse drive provided by the gear box does not affect the relative conditions of operation of the coupling device $i$ $i^1$ or $j$ $j^1$ and the friction members $f$ $g$.

Moreover an automatic free-wheeling action is provided by the screw or cam coupling device $i$ $i^1$ or $j$ $j^1$ since any tendency of the vehicle to overrun the engine will result in the driven member $g$ being relieved of axial thrust, owing to the reversal of the torque in the transmission. When this occurs, the screw or cam coupling device will tend to draw back the shaft $h$ against the action of the spring $r$, but without actually separating the members $f$ and $g$, until a state of balance is reached at the point where the driven member $g$ slips upon the slower running member $f$ under a light contact pressure (less than the compression of the spring $r$), the resistance thus set up in the transmission being just sufficient to maintain the reversed torque required for causing the screw coupling device to oppose the spring. This spring $r$ being intended mainly to secure an initial engagement of the gearing members, when the vehicle is being started from rest, the full compression of the spring is relatively weak; consequently when this spring compression is opposed by the reversed action of the screw coupling device, the differential pressure at the surfaces of the gearing members $f$, $g$ is quite small and the slipping effect is equivalent in practice to the action of a free wheel device. When the overrunning ceases, the spring $r$ will cause automatic re-engagement of the friction gearing members, the pressure being increased to normal as soon as the engine resumes the drive so as to produce a torque in the forward direction at the screw or cam coupling device $i$ $i^1$ or $j$ $j^1$.

Hydraulic or other pressure may also be employed for producing the axial pressure which maintains the friction gearing members in engagement, by means for example of a ram mounted upon or connected to the shaft of the driven member inside the sleeve $h^3$, the pressure acting at any given time being regulated manually or by any convenient means.

Similarly, the friction clutch may be controlled by the hydraulic pressure, for example as shown in Figure 10; the oil pressure from the pump $l$ is admitted through a suitable valve $u$ to a ram $v$ of which the piston $v^1$ is connected to the pedal lever $v^3$ upon the cross shaft $d$, the hydraulic pressure acting preferably to release the clutch against the action of clutch springs $v^4$ fitted between the presser plate $a^5$ and the cover plate $b^2$, through the medium of the thrust collar $d^2$, levers $a^1$ and plungers $a^4$; in the re-engaging movement, the ram $v$ will act in the manner of a dash pot to prevent sudden clutching effects.

It will be understood that the invention is not limited to the particular arrangement and details of construction described. For example the driven member $g$ of the friction gearing may have its supporting shaft $h$ rotatably mounted in a radius arm pivoted at one side of the center line of the engine and driving member $f$, the radius arm controlling by its swinging movement the coaxial or eccentric position of the driven member $g$ relative to the driving member $f$; with such an arrangement the driven shaft may be slidable through the socket on the radius arm, the screw or cam coupling device $i\ i^1$ or $j\ j^1$ causing or allowing an axial displacement of the driven member $g$ in proportion to its lateral displacement, or alternatively the radius arm itself may be given an axial displacement along its pivot, proportional to its swinging movement, by means of a quick pitch screw or cam device, so as in either case to maintain constant engagement of the driven member $g$ with the coned driving member $f$, while the coupling $i\ i^1$ or $j\ j^1$ produces an axial thrust on the driven member $g$ in proportion to the torsional resistance as above described.

The swinging movement of the radius arm may be controlled by a toothed quadrant in mesh with an irreversible worm rotatable in either direction by a suitable motor, or there may be employed a hydraulic cylinder the piston of which acts directly upon the radius arm or upon a crank secured thereto, the pressure and exhaust valves being so arranged that the radius arm will remain in any selected position to which it is moved by the controlling piston.

The radius arm may be replaced by a rotatable disc, the socket $h^4$ containing the shaft and bearings of the driven member $g$ being offset eccentrically from the axis of the disc to such an extent that on rotation of the disc the driven member can move into either the direct drive or the low gear position.

What we claim is:—

1. In variable speed friction gearing, comprising a driving member, a driven member adapted to make coaxial face contact with said driving member, and means for displacing said driven member laterally in eccentric relation to said driving member, the combination of a coupling device transmitting torque from said driven member, said coupling device controlling the engaging pressure upon said driving and driven members both in their coaxial and in their eccentric positions according to the torque transmitted by said coupling device, and means for exerting an initial engaging pressure upon said driving and driven members, said coupling device being adapted to oppose said means for exerting an initial engaging pressure in the event of reversal of the torque at said coupling device.

2. In variable speed friction gearing, comprising a driving member, a driven member adapted to make coaxial face contact with said driving member, and means for displacing said driven member laterally in eccentric relation to said driving member, the combination of a friction clutch adapted to convey rotary motion to said driving member, speed-controlled means for engaging said friction clutch, a coupling device transmitting torque from said driven member, said coupling device producing engaging pressure upon said driving and driven members both in their coaxial and in their eccentric positions in proportion to the torque transmitted by said coupling device, and means for exerting an initial engaging pressure upon said driving and driven members, said initial engaging pressure being of low value relative to the pressure produced by said coupling device.

JOHN HOGG ROBERTSON.
JOHN ROBERTSON, Junior.
LEONARD GUTTERIDGE.
LIONEL HORACE HOWARD.